US009578595B2

(12) United States Patent
Hegde et al.

(10) Patent No.: US 9,578,595 B2
(45) Date of Patent: Feb. 21, 2017

(54) PARALLEL SCANNING OF WIRELESS CHANNELS

(71) Applicant: Broadcom Corporation, Irvine, CA (US)

(72) Inventors: Gireesh Hegde, Bangalore (IN); Harish Vaidya, Bangalore (IN); Rakesh Raman, Bangalore (IN); Sriram Neelakandan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 416 days.

(21) Appl. No.: 13/927,734

(22) Filed: Jun. 26, 2013

(65) Prior Publication Data

US 2014/0376392 A1  Dec. 25, 2014

Related U.S. Application Data

(60) Provisional application No. 61/838,518, filed on Jun. 24, 2013.

(51) Int. Cl.
*H04W 48/16* (2009.01)
*H04W 48/20* (2009.01)
*H04W 76/00* (2009.01)

(52) U.S. Cl.
CPC ............. *H04W 48/16* (2013.01); *Y02B 60/50* (2013.01)

(58) Field of Classification Search
CPC ..... H04W 48/16; H04W 8/005; H04W 48/20; H04W 36/0072; H04W 76/025; Y02B 60/50
See application file for complete search history.

(56) References Cited

U.S. PATENT DOCUMENTS

| 8,238,296 | B2 * | 8/2012 | Sim et al. ............. 370/329 |
| 2006/0215627 | A1 * | 9/2006 | Waxman ................ 370/347 |
| 2007/0002884 | A1 * | 1/2007 | Jaakkola et al. ........ 370/431 |
| 2009/0310563 | A1 * | 12/2009 | Chou et al. ............ 370/331 |
| 2011/0075589 | A1 * | 3/2011 | Bradley et al. ......... 370/254 |
| 2011/0096739 | A1 * | 4/2011 | Heidari et al. ......... 370/329 |
| 2013/0260751 | A1 * | 10/2013 | Skarp ..................... 455/434 |
| 2013/0286937 | A1 * | 10/2013 | Liu et al. ............... 370/328 |

* cited by examiner

*Primary Examiner* — Ahmed Elallam
(74) *Attorney, Agent, or Firm* — Fiala & Weaver P.L.L.C.

(57) ABSTRACT

Methods, systems, and apparatus for parallel scanning of channels in communication networks are described herein. A parallel scanning device performs a scanning operation that includes parallel (i.e., simultaneous) scanning of channels that are in a common frequency band or in different frequency bands. The parallel scanning of channels results in a reduction of scan time, which reduces power consumption. Furthermore, a scanning operation may undesirably interrupt and/or delay normal communication traffic to and from the parallel scanning device, and the comparatively shorter scan time resulting from the parallel scanning operation can reduce such interruption and/or delay.

20 Claims, 6 Drawing Sheets

PARALLEL SCANNING OF WIRELESS CHANNELS

CROSS-REFERENCE TO RELATED APPLICATION(S)

This application claims the benefit of U.S. Provision Application No. 61/838,518, filed on Jun. 24, 2013, which is incorporated by reference herein in its entirety.

BACKGROUND

Technical Field

The subject matter described herein generally relates to methods and apparatuses for parallel scanning of channels in communication networks, such as a wireless local area network (WLAN).

Description of Related Art

Communication systems typically support wired and wireless communications between communication devices. Communication systems operate in accordance with one or more communication standards, such as Ethernet or IEEE 802.11/Wi-Fi. Depending on the type of communication system, a wireless communication device, such as a cellular telephone or laptop computer, may communicate directly or indirectly with other wireless communication devices. For direct communication (i.e., point-to-point), the participating wireless communication devices tune their transceivers to the same channel(s) (e.g., one of a variety of channels in an operating frequency range of the wireless communication system) and communicate over those channel(s). For indirect communication, each wireless communication device communicates directly with an associated access point via an assigned channel.

Thus, for indirect wireless communication, a wireless communication device typically performs a scanning operation to discover access points that are available to communicate with the wireless communication device. Conventionally, the scanning operation includes sending a probe request and listening for probe request response(s) from available access points in a sequential manner, scanning one channel at a time until all channels have been scanned for a particular frequency band. The scanning operation may continue with respect to another frequency band if the wireless device is capable of operating in that frequency band. The length of the scanning operation depends on the number of channels and/or frequency bands that are to be scanned. The longer the scanning operation, the more power is consumed. Many wireless communication devices are mobile devices that are battery-powered. Thus, power conservation (e.g., powering down transceivers) is important, especially for wireless communication devices.

BRIEF SUMMARY

Methods, systems, and apparatuses are described for parallel scanning of wireless channels in a communication network, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the subject matter of the present application and, together with the description, further serve to explain the principles of the embodiments described herein and to enable a person skilled in the pertinent art to make and use such embodiments.

Figure 1:
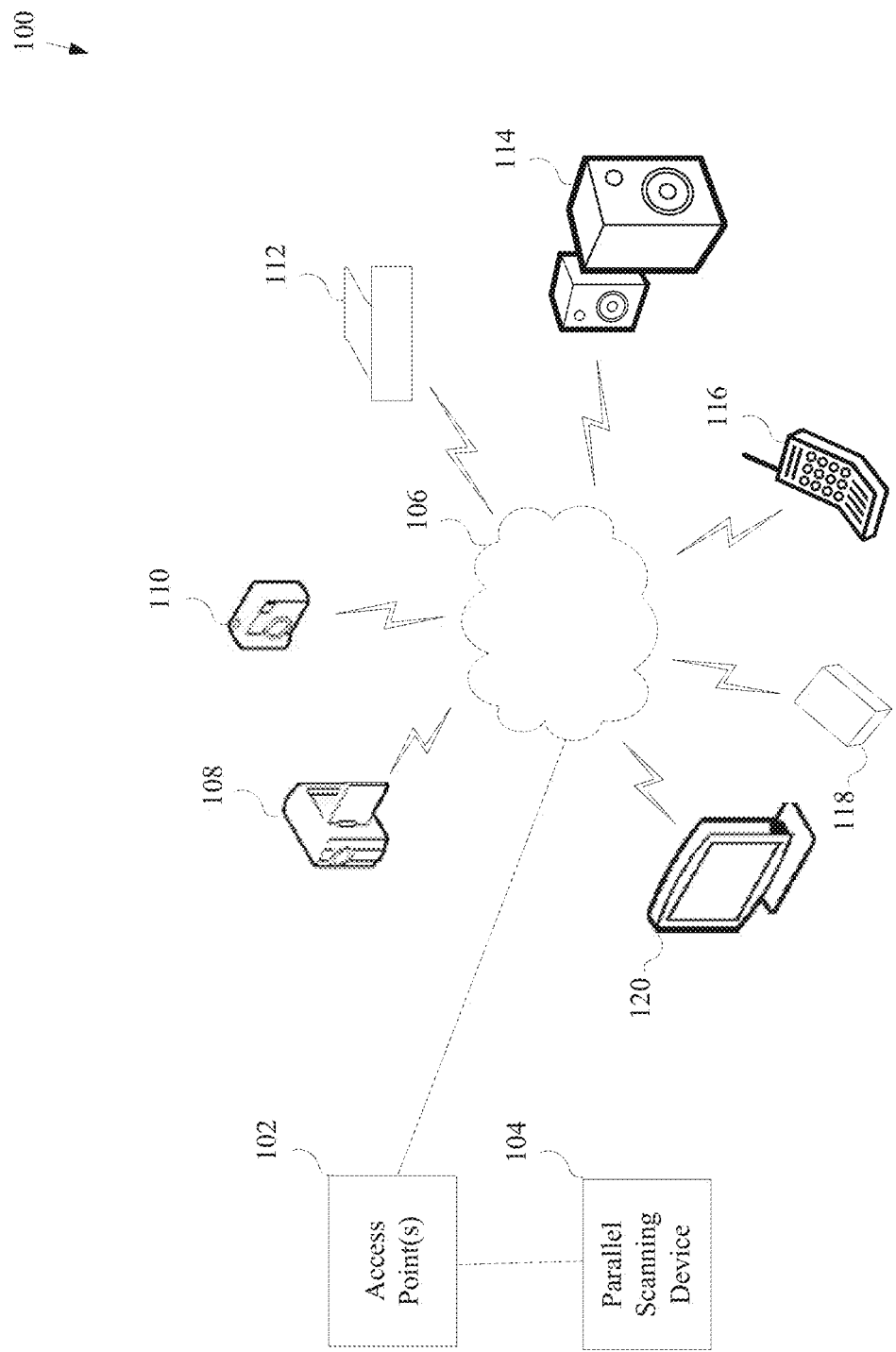
FIG. 1 is a block diagram of an example simultaneous dual-band communication system in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

A. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

Methods, systems, and apparatuses for parallel scanning of channels in communication networks are described herein. In accordance with certain embodiments, a parallel scanning device performs a scanning operation that includes parallel (i.e., simultaneous) scanning of channels that are in a common (i.e., same) frequency band or different frequency bands. The parallel scanning of channels may result in a reduction of scan time, which may reduce power consumption. For instance, transceivers in the parallel scanning device may be powered down or placed in an idle mode after the scanning operation is completed. The power consumed during idle mode may be less than the power consumed during normal operating mode. Furthermore, the scanning operation may undesirably interrupt and/or delay normal communication traffic to and from the parallel scanning device, and a shorter scan time can reduce (e.g., eliminate) this interruption and/or delay.

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner.

B. Example Embodiments

FIG. 1 is a block diagram of an example simultaneous dual-band communication system 100 in accordance with an embodiment. Communication system 100 supports wireless and wired communications between wireless and/or wired devices, such as one or more access point(s) 102, a parallel scanning device 104, a camcorder 108, a camera 110, a printer 112, one or more speakers 114, a cellular phone 116, an external hard drive 118, and a monitor 120. Parallel scanning device 104 is a dual-radio/transceiver device (e.g., station) that is capable of scanning WLAN channels, in one or more frequency bands, in parallel (i.e., scanning multiple (e.g., two) channels by simultaneously sending probe requests via the multiple channels). Parallel scanning device 104 may be a wired or wireless device. Each of the devices in communication system 100 may be directly or indirectly connected to a communication network 106 via a wired or a wireless connection. Communication among the devices of communication system 100 is carried out over communication network 106 using well-known network communication protocols. Communication network 106 may be a wide-area network (e.g., the Internet), a local area network (LAN) such as a wireless LAN (WLAN), a public switch telephone network, another type of network, or a combination thereof. In addition, access point(s) 102 may communicate with each other and/or other devices not shown in FIG. 1 directly or indirectly via a system controller, the public switch telephone network, the Internet, and/or via some other wide area network.

Communication system 100 may operate in accordance with one or more wired communication standards (e.g., Ethernet, System Packet Interface (SPI), or Secure Digital Input Output (SDIO)), wireless communication standards (e.g., Institute of Electrical and Electronics Engineers (IEEE) 802.11, Bluetooth, advanced mobile phone services (AMPS), digital AMPS, global system for mobile communications (GSM), code division multiple access (CDMA), time division synchronous code division multiple access (TD-SCDMA), local multi-point distribution systems (LMDS), or multi-channel-multiple-point distribution systems (MMDS)), or various other standards.

For illustration purposes, embodiments may be described in connection with the IEEE 802.11/Wi-Fi standards, which implement WLAN communication in the 2.4, 3.6, 5, and 60 gigahertz (GHz) frequency bands. Although embodiments are described below with respect to the 2.4 and 5 GHz frequency bands, it will be recognized that the example embodiments are applicable to other suitable frequency bands. Components that communicate via a wireless medium in a WLAN are referred to as stations (STAs), which are equipped with wireless network interface controllers. Stations may act as access points or clients. An access point (e.g., a router) is a base station in a wireless network. Such a base station transmits and receives radio signals to enable communication among wireless clients. Wireless clients include but are not limited to mobile devices (e.g., laptops, personal digital assistants (PDAs), smartphones, and desktops/workstations that are equipped with a wireless network interface).

In order to participate in wireless communication, parallel scanning device 104 may perform a parallel scanning operation to find a suitable first access point (e.g., one of access point(s) 102), and then authenticate and associate with the first access point. As parallel scanning device 104 moves (e.g., out of range of the first access point), it may authenticate a second access point (e.g., one of access point(s) 102 that is different from the first access point). When association with the first access point is no longer desirable, parallel scanning device 104 may associate with the second access point. The second access point notifies the first access point of the new location of parallel scanning device 104 and terminates the previous association of parallel scanning device 104 with the first access point. At some point, parallel scanning device 104 may need to perform another scanning operation to find another access point and repeat the authentication and association process.

Figure 2:
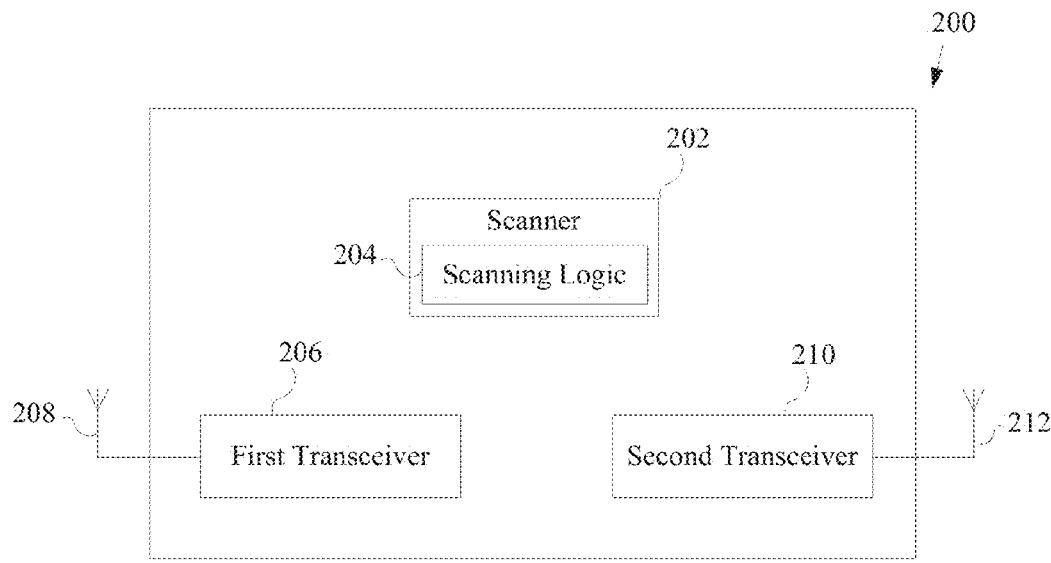
FIG. 2 is a block diagram of an example parallel scanning device shown in FIG. 1 in accordance with an embodiment.

FIG. 2 is a block diagram of an example parallel scanning device 200 configured for parallel scanning in accordance with an example embodiment. Parallel scanning device 200 may be an example of parallel scanning device 104 shown in FIG. 1. Parallel scanning device 200 includes a scanner 202, a first transceiver 206, and a second transceiver 210. First transceiver 206 and second transceiver 210 are shown in FIG. 2 as being coupled to respective antennas 208 and 212 for illustrative purposes, though it will be recognized that first transceiver 206 and second transceiver 210 may be coupled to a common (e.g., single) antenna. In some example embodiments, first antenna 208 and second antenna 212 are included in an antenna array.

In telecommunications, relatively low-frequency parts of a signal that is to be transmitted may be converted to relatively higher frequencies for transmission purposes because the relatively lower frequencies may be passed with greater distortion in some communication media. The original, relatively low-frequency components of the signal are commonly referred to as the baseband signal and the converted, relatively high-frequency components are commonly referred to as the radio frequency (RF) signal. A transceiver may be referred to herein as a radio, a radio transceiver, and/or a transceiver chain as each transceiver operates under the medium access control (MAC) specification and the physical layer (PHY) specification.

Parallel scanning device 200 is operable in different modes. For example, parallel scanning device 200 may be operated in a single-input single-output (SISO) mode, in which one transmitter and one receiver are utilized to send data over a single radio frequency channel; multiple-input multiple-output mode, in which two or more transmitters and two or more receivers are utilized to send data simultaneously over the same radio frequency channel, or real simultaneous dual-band (RSDB) mode, in which multiple transceivers are utilized to send data simultaneously over the same or different radio frequency channels/bands. The input and output terminology refers to the radio frequency channel. For example, the input (single or multiple) is driven by the transmitter(s) and the output (single or multiple) feeds the receiver(s).

Scanner 202 is configured to conduct a scanning operation to discover access points that are available to communicate with the parallel scanning device 200 via a wireless medium. Each of first transceiver 206 and second transceiver 210 may include a data modulation stage and a radio frequency (RF) stage. The data modulation stage, in the baseband process, converts between data and baseband signals in accordance with a particular wireless communication standard (e.g., 802.11 standards). The RF stage includes transmitter circuitry and receiver circuitry, and converts between baseband signals and RF signals. The RF stage may convert directly between baseband and RF or may include one or more intermediate frequency stages. Each of first transceiver 206 and second transceiver 210 may be associated with an antenna configuration in accordance with an operating mode (e.g., SISO, MIMO, RSDB) thereof. An antenna configuration indicates a relationship between first antenna 208 and second antenna 212 (e.g., same or different) and how they may be associated with first transceiver 206 and second transceiver 210. Each of scanner 202, first transceiver 206, and second transceiver 210 may be implemented in hardware, or a combination of hardware and software and/or firmware. The operation of parallel scanning device 200 will be described below.

Scanner 202 is configured to perform a scanning operation on channels that are included in one or more frequency bands (e.g., 2.4 GHz or 5 GHz) to discover access point(s) that are available to communicate with parallel scanning device 200. In accordance with the scanning operation, scanner 202 provides probe requests that are to be transmitted by first transceiver 206 and/or second transceiver 210 and listens for probe responses from available access points that are received by first transceiver 206 and/or second transceiver 210. Scanner 202 includes scanning logic 204, which is configured to provide a scan instruction indicating that multiple channels of a wireless network are to be scanned simultaneously. For example, scanning logic 204 is configured to provide a scan instruction to first transceiver 206 and second transceiver 210, upon determining that a scanning operation is to be performed, instructing first transceiver 206 and second transceiver 210 to prepare for and conduct a parallel scan operation. The scanning operation may include sending a frame to an access point with which the parallel scanning device 200 is currently associated, informing the access point that parallel scanning device 200 is going into power-save mode. In the power-save mode, parallel scanning device 200 sends probe requests and may receive probe responses in return.

As part of the scanning operation, scanning logic 206 may determine which channel to start scanning and/or which frequency band(s) to assign to first transceiver 206 and/or second transceiver 210. For example, the 2.4 GHz frequency band covers the frequency range of 2.4 to 2.4835 GHz and may include channels 1-14, for example. The 5 GHz frequency band covers the frequency range of 5.15 to 5.35 and 5.725 to 5.825 GHz and includes far more channels than the 2.4 GHz frequency band. In either of these frequency bands, the number of channels in each frequency band depends on the geographic region (e.g., country) in which parallel scanning device 200 operates because the usage of frequency bands typically is regulated by governmental entities. For example, in the United States, the 2.4 GHz frequency band includes 11 channels, and the 5 GHz frequency band includes 22 channels. In Europe, the 2.4 GHz frequency band includes 13 channels, and the 5 GHz frequency band includes 24 channels. In Japan, the 2.4 GHz frequency band includes 14 channels, and the 5 GHz frequency band includes 27 channels.

Scanning logic 204 is further configured to determine an antenna configuration and/or to configure antennas that are available to first transceiver 206 and second transceiver 210 (e.g., antenna 208 and/or antenna 212). The antenna configuration may influence the scanning operation. In an example embodiment, first transceiver 206 and second transceiver 210 share a common (i.e., same) antenna (e.g., antenna 208 or antenna 212) and may simultaneously send a first probe request and a second probe request from the common antenna. In accordance with this embodiment, a parallel scan may be performed with respect to channels in different frequency bands or with respect to channels in a common frequency band so long as the channels that are simultaneously scanned are sufficiently separated so that the scanning of each channel does not unduly interfere with scanning of the other channel. In another example embodiment, each of first transceiver 206 and second transceiver 210 has a dedicated antenna. For instance, as shown in FIG. 2, first transceiver 206 may be coupled to first antenna 208, and second transceiver 210 may be coupled to second antenna 212. In accordance with this embodiment, scanning logic 204 may simultaneously provide a first probe request and a second probe request from the first antenna 208 and second antenna 212, respectively. In further accordance with this embodiment, a parallel scan may be performed with respect to channels in different frequency bands or with respect to channels in a common frequency band.

If parallel scanning device 200 is currently associated with an access point, scanning logic 204 may send the associated access point a message (e.g., frame) indicating that parallel scanning device 200 intends to go into power-save mode. During power-save mode, normal traffic between the associated access point and parallel scanning device 200 may be temporarily suspended (e.g., the associated access point may hold (e.g., buffer) incoming data and hold outgoing data) until parallel scanning device 200 is no longer in power-save mode. Typically, in order to maintain the association between parallel scanning device 200 and the associated access point, parallel scanning device 200 needs to be active on the channel of the associated access point (e.g., home channel) at predetermined times (e.g., according to beacon timing controlled by the associated access point) to receive a beacon from the associated access point. A beacon is a frame that includes information such as time-stamp, beacon interval, capability, service set identifier, supported rates, country, power constraint, channel switch announcement, antenna, high-throughput capabilities, and other parameters or information. When an association needs to be maintained, the scanning operation may at times be suspended to accommodate the receipt of the beacon on the home channel. Depending on the operating mode of parallel scanning device 200, it may be possible for only one transceiver to utilize the home channel to await the beacon while the other transceiver may continue with the scanning process. When parallel scanning device 200 is not currently associated with an access point, the scanning operation may be performed through completion (i.e., all channels in all frequency bands have been scanned) without any suspension.

Scanning logic 204 is further configured to control the sending of probe requests and receiving of probe responses from access points. Moreover, first transceiver 206 and second transceiver 210 are configured to simultaneously provide respective first and second probe requests via respective first and second channels in response to receipt of a scan instruction from scanning logic 204. The first probe request is configured to discover first access point(s) that are available to communicate with parallel scanning device 200 via the first channel. The second probe request is configured to discover second access point(s) that are available to communicate with parallel scanning device 200 via the second channel. For example, a first probe request may be sent from first transceiver 206 on a channel in the 2.4 GHz band, and a second probe request may be sent from second transceiver 210 on a channel in the 5 GHz frequency band. In another example, a first probe request may be sent on a first channel in a frequency band (e.g., 2.4 GHz or 5 GHz), and a second request may be sent on a second channel in the same frequency band.

A probe request is a request (e.g., frame) that is configured to solicit a response from each access point that is available to communicate with the parallel scanning device (parallel scanning device 200) with which the probe request is transmitted. The probe request may request information and/or contain information such as service set identifiers, supported rates, extended supported rates, distribution system parameter set, supported operating classes, high throughput capabilities, 20/40 basic service set coexistence, extended capabilities, service set identifier list, channel usage, interworking, a mesh identifier, and/or other information (e.g., vendor specific information).

Scanning logic 204 is configured to monitor the channels that are being scanned by first transceiver 206 and second transceiver 210 for a designated period of time after the probe requests are sent to determine whether a response is received from one or more access points. The designated period of time (a.k.a dwell time) is a configurable parameter (e.g., 20 milliseconds). An access point that is available to communicate with parallel scanning device 200 via the scanned channel may respond to the probe request with a probe response (e.g., frame). The probe response may contain information such as timestamp, beacon interval, capability, service set identifier, supported rates, frequency hopping parameter set, distributed service set parameter set, contention-free parameter set, independent basic service set, country, frequency hopping parameters, frequency hopping pattern table, power constraint, channel switch announcement, extended supported rates, robust security network, basic service set load, beacon timing, and/or other information. The scanning operation may continue with the sending of probe requests and receiving of probe responses via each of the channels in sequential order (e.g., channel 1 is scanned before channel 2).

There may be more channels to scan in the 5 GHz frequency band than in the 2.4 GHz frequency band. Thus, in one example embodiment, after all channels in the 2.4 GHz frequency band have been scanned during a parallel scanning process, both first transceiver 206 and second transceiver 210 may be used to scan the remaining channels in the 5 GHz frequency band. In accordance with this example embodiment, the parallel scanning process involves simultaneously sending probe requests to different channels in the same frequency band (i.e., the 5 GHz frequency band in this example). While there may be no interference problems when first transceiver 206 and second transceiver 210 simultaneously operate in different frequency bands, there may be some interference issues with first transceiver 206 and second transceiver 210 operating in the same frequency band. For example, there may be channel interference issues if two probe requests are sent to two channels that are adjacent to each other. Thus, scanning logic 204 may be configured to determine the separation needed between the channels to be scanned to avoid interference issues. This determination may be based on the antenna configuration and/or specific characteristics of the frequency bands (e.g., channel width and/or spacing between the channels).

For example, scanning logic 204 may determine an isolation measure between first and second channels that are to be scanned. The isolation measure indicates an extent of isolation that exists between the first and second channels. In accordance with this example, scanning logic 204 may compare the isolation measure to a predetermined threshold. If the isolation measure is greater than the threshold, scanning logic 204 may determine that probe requests are to be sent via the first and second channels simultaneously. For instance, the isolation measure being greater than the threshold may indicate that there is sufficient separation between the first and second channels for the probe requests to be sent via the first and second channels simultaneously without causing either probe request to interfere with the other. If the isolation measure is less than the threshold, scanning logic 204 may determine that probe requests are not to be sent via the first and second channels simultaneously. For instance, the isolation measure being less than the threshold may indicate that there is insufficient separation between the first and second channels for the probe requests to be to be sent via the first and second channels simultaneously. Nevertheless, one or more antennas may be tuned to the first and/or second channels to passively listen for beacons from access points.

Scanning logic 204 is further configured to provide scan results to an application. Such application may be a software-based application on a smartphone or other mobile parallel scanning devices. The scan results may indicate access points that are available to communicate with parallel scanning device 200 via the scanned channels of one or more frequency bands. In particular, the scan results may indicate each access point that is available to connect with the parallel scanning device 200 via each scanned channel. The scan results may include information (e.g., addresses, capabilities, and beacon times) compiled from probe responses received from available access points.

Figure 3:
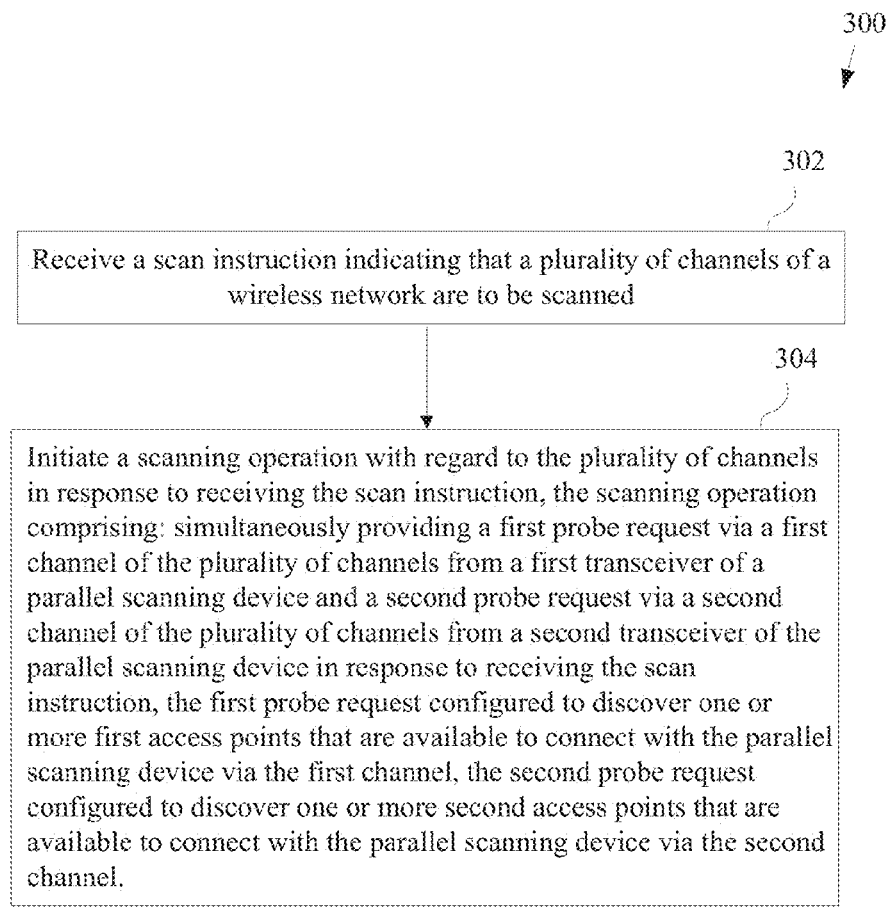
FIG. 3 depicts a flowchart of an example method for parallel scanning in accordance with an embodiment.

In embodiments, parallel scanning device 200 may operate in various ways to perform a parallel scanning operation. For instance, FIG. 3 depicts a flowchart 300 of an example method for parallel scanning in accordance with an embodiment. Flowchart 300 is described with respect to parallel scanning device 200 and communication system 100 for illustrative purposes. The steps of flowchart 300 may be performed in an order different than the order shown in FIG. 3 in some embodiments. Further structural and operational embodiments will be apparent to persons skilled in the relevant art(s) based on the following description of flowchart 300.

Flowchart 300 begins with step 302. In step 302, a scan instruction indicating that a plurality of channels of a wireless network are to be scanned. For example, in an embodiment, scanning logic 204 is configured to provide the scan instruction indicating that the plurality of channels (e.g., channels of the 2.4 GHz and/or 5 GHz frequency bands) of the wireless network (e.g., communication network 106) are to be scanned. The scan instruction may be generated by scanning logic 204 or derived from a scan request from an application (e.g., a software application running on a smartphone), a user command, or some other source. The scan instruction may be provided to first transceiver 206 and second transceiver 210 in the scanning process.

Flowchart 300 continues with step 304. In step 304, a scanning operation is initiated with regard to the plurality of channels in response to receiving the scan instruction. The scanning operation includes simultaneously providing a first probe request via a first channel of the plurality of channels from a first transceiver of a parallel scanning device and a second probe request via a second channel of the plurality of channels from a second transceiver of the parallel scanning device in response to receiving the scan instruction. The first probe request is configured to discover one or more first access points that are available to connect with the parallel scanning device via the first channel. The second probe request is configured to discover one or more second access points that are available to connect with the parallel scanning device via the second channel.

For example, in an embodiment, scanning logic 204 is configured to initiate a scanning operation as described above in connection with parallel scanning device 200. The scanning operation may include simultaneously providing a first probe request via a first channel of the plurality of channels (e.g., channels on either the 2.4 GHz or the 5 GHz frequency band) from first transceiver 206 of parallel scanning device 200 and a second probe request via a second channel of the plurality of channels from second transceiver 210 of parallel scanning device 200 in response to receiving the scan instruction from scanning logic 204. The first probe request is configured to discover one or more first access points that are available to connect with parallel scanning device 200 via the first channel. Moreover, the second probe request is configured to discover one or more second access points that are available to connect with parallel scanning device 200 via the second channel.

In an embodiment, first transceiver 206 and second transceiver 210 are configured to simultaneously provide the first probe request via the first channel in a first wireless local area network frequency band (e.g., 2.4 GHz frequency band or 5 GHz frequency band) and the second probe request via the second channel in a second wireless local area network frequency band that is different from the first wireless local area network frequency band. In another embodiment, first transceiver 206 and second transceiver 210 are configured to simultaneously provide the first and second probe requests via respective first and second channels of the same wireless local area network frequency band (e.g., either 2.4 GHz or 5 GHz). In yet another example embodiment, first transceiver 206 and second transceiver 210 are configured to simultaneously send the respective first and second probe requests from a single, shared antenna. In a further embodiment, first transceiver 206 and second transceiver 210 are configured to simultaneously provide the respective first and second probe requests from respective first and second antennas.

In an example embodiment, scanning logic 204 is configured to monitor the first channel during a designated period of time (e.g., dwell time) to determine whether at least one first response is received from at least one respective first access point via the first channel in response to the first probe request. In accordance with this embodiment, scanning logic 204 is further configured to monitor the second channel during the designated period of time to determine whether at least one second response is received from at least one respective second access point via the second channel in response to the second probe request. The dwell time is configurable (e.g., 30 milliseconds) and may be configured manually or automatically by a user of the parallel scanning device 200, by a software program/routine, or some other entity.

In an example embodiment, scanning logic 204 is configured to provide scan results regarding the scanning operation to an application (e.g., an application on a mobile device). The scan results may indicate access points that are available to communicate with parallel scanning device 200 via the plurality of channels of the wireless network (e.g., channels on the 2.4 GHz frequency band and/or the 5 GHz frequency band). In particular, the scan results may indicate each first access point from which a first response is received and each second access point from which a second response is received. The scan results may include information (e.g., addresses, capabilities, and/or beacon times) gathered from probe responses received from the available access points.

Figure 4:
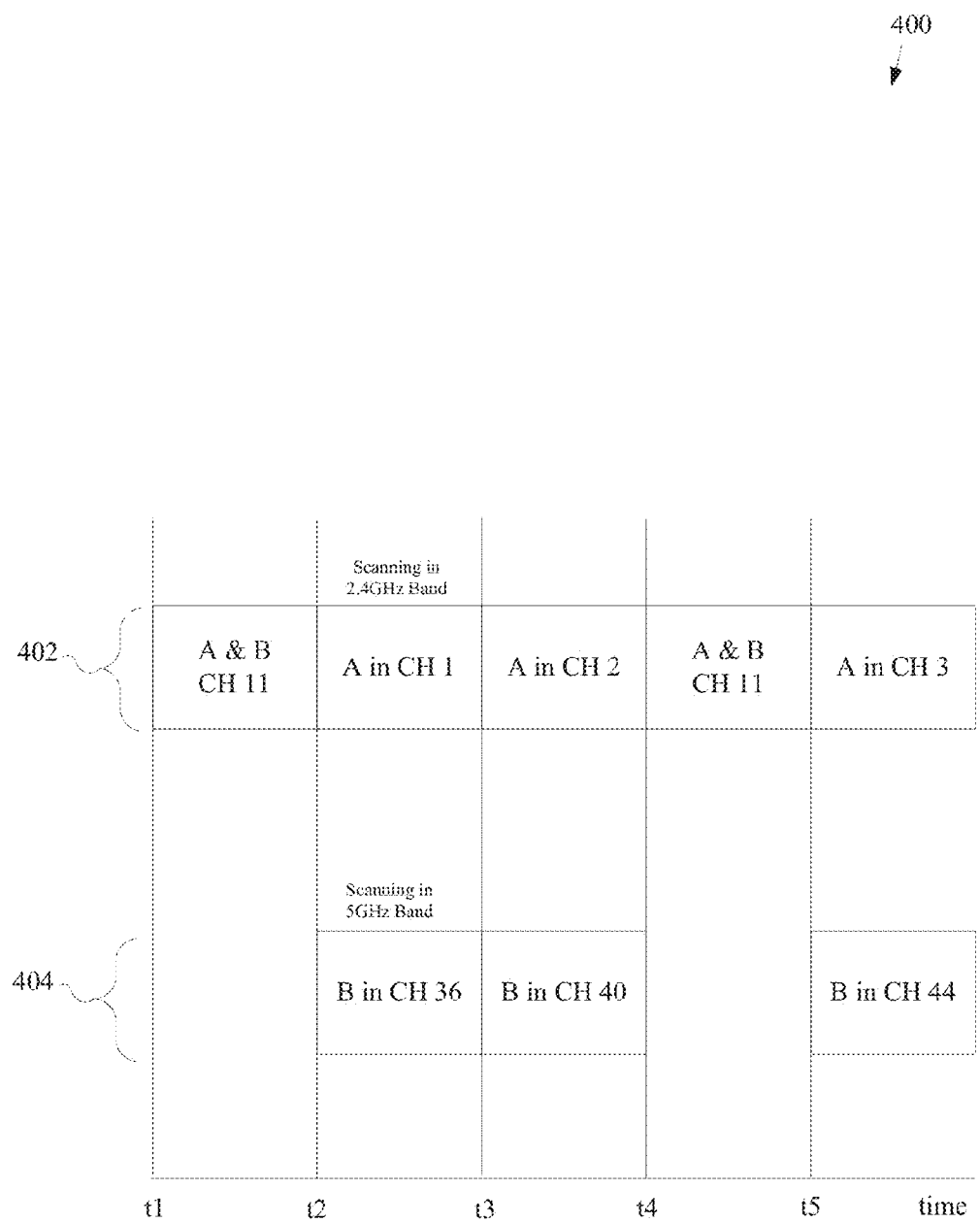
FIG. 4 depicts a timing diagram of an example parallel scanning technique in accordance with an embodiment.

FIG. 4 depicts a timing diagram of a parallel scanning technique in accordance with an embodiment. FIG. 4 is described in connection with communication system 100 and/or parallel scanning device 200 for illustration purposes, and is not intended to be limiting. Timing intervals 402 correspond to a first frequency band (2.4 GHz in this non-limiting example), and timing intervals 404 correspond to a second frequency band (5.0 GHz in this non-limiting example). "A" represents a first transceiver (e.g., first transceiver 206) in a dual-transceiver device (e.g., parallel scanning device 104), and "B" represents a second transceiver (e.g., second transceiver 210) in the dual-transceiver device). "CH 1" represents a first channel of the first frequency band; "CH 2" represents a second channel of the first frequency band; and "CH 3" represents a third channel of the first frequency band. "CH 36" represents a first channel of the second frequency band; "CH 40" represents a second channel of the second frequency band; and "CH 44" represents a third channel of the second frequency band. "CH 11" represents a "home channel" with which each of the first and second transceivers A and B has an active connection (e.g., association). It will be recognized that Channel 11 (represented as "CH 11") of the first frequency band is described as being the home channel for illustrative purposes and is not intended to be limiting.

In the embodiment of FIG. 4, a parallel scanning device is configured to operate in MIMO mode. At time t1, both transceivers A and B of the parallel scanning device are associated with home channel 11. Upon receiving a scan request at time t2, transceiver A moves to channel 1 (i.e., to scan for access points that are available on channel 1), and transceiver B moves to channel 36 for scanning (i.e., to scan for access points that are available on channel 36). At time t3, to continue the scanning operation, transceiver A moves to channel 2 (i.e., to scan for access points that are available on channel 2), and transceiver B moves to channel 40 (i.e., to scan for access points that are available on channel 40). This scanning operation may continue until all desired channels are scanned. As mentioned above, at time t1, transceivers A and B are operating in MIMO mode for illustrative purposes. However, it will be recognized that transceivers A and B need not necessarily operate in MIMO mode at t1. For instance, transceivers A and B may operate in RSDB mode (e.g., multiple MAC/PHY/radio chains for the multiple transceivers, with the chains being capable of operating in different channels/bands) in different channels; or one of the transceivers A or B may be idle at t1; or both of the transceivers A and B may be idle at t1.

Figure 5:
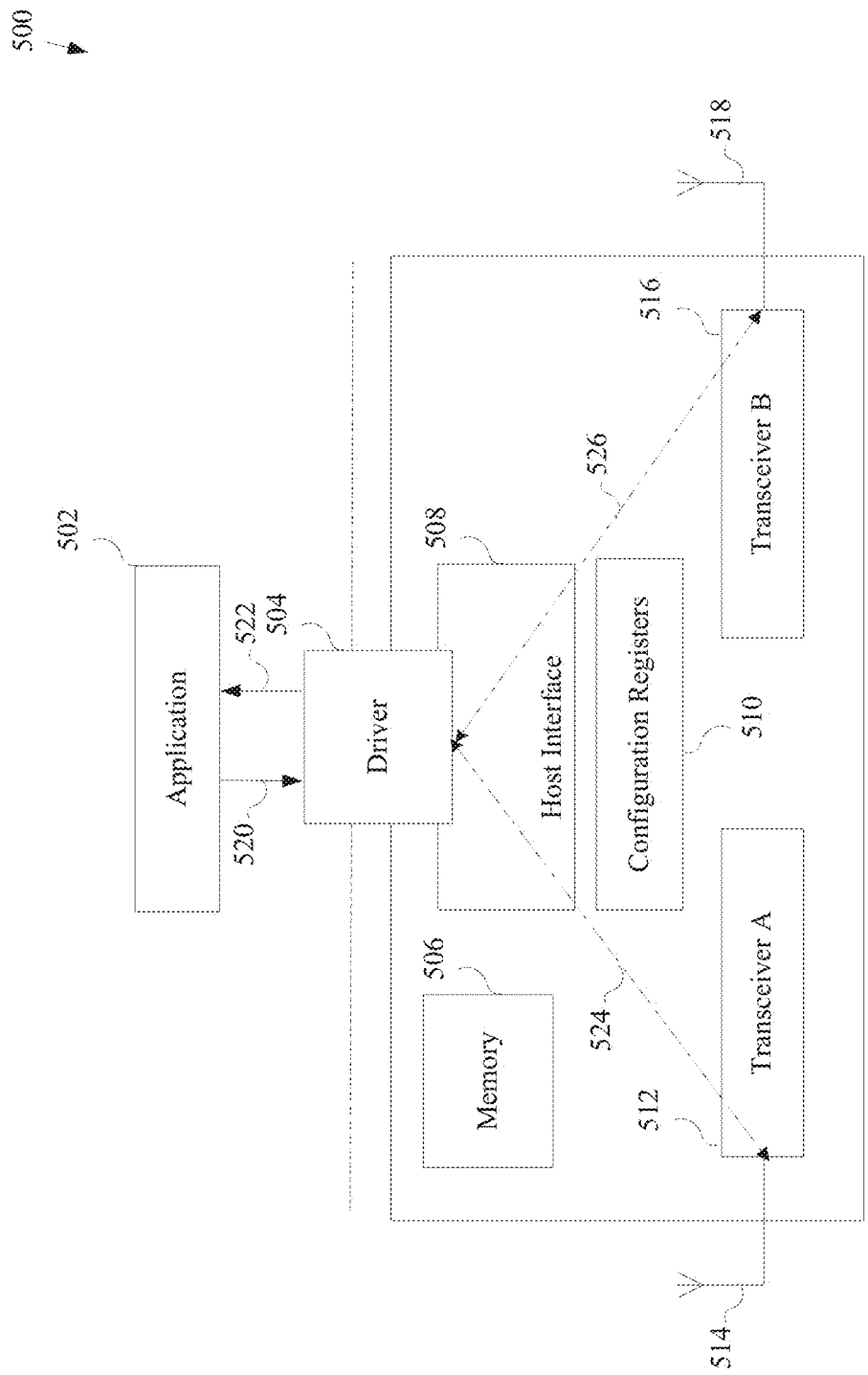
FIG. 5 is a block diagram of another example parallel scanning device in accordance with an embodiment.

FIG. 5 is a block diagram of another example parallel scanning device 500 in accordance with an embodiment. Parallel scanning device 500 may be an example of any of the parallel scanning devices shown in FIG. 1 (e.g., parallel scanning device 104). Parallel scanning device 500 includes an application 502, a driver 504, memory 506, a host interface 508, configuration registers 510, a transceivers 512 and 516 (denoted as transceiver A and transceiver B, respectively). Transceiver 512 and transceiver 516 are shown in FIG. 5 as being associated with antenna 514 and antenna 518, respectively. In embodiments, antenna 514 and antenna 518 may be configured according to an antenna configuration in which antenna 514 and antenna 518 are the same, in which antenna 514 and antenna 518 are different, in which antenna 514 and antenna 518 are included in an antenna array, or other suitable configuration. In embodiments, parallel scanning device 500 may include other components not shown in FIG. 5 or may include fewer components than shown in FIG. 5. Similar to parallel scanning device 200, parallel scanning device 500 is capable of operating in a variety of modes: SISO, MIMO, or RSDB. The operating modes, antenna configuration and any other configuration parameters regarding transceiver 512 and transceiver 516 may be stored in configuration registers 510 that are accessible by driver 504.

In an example embodiment, driver 504 receives a scan request 520 from application 502. Application 502 may be any application (e.g., software program) that seeks information that can be determined from a scan of the channels in the frequency band(s) with which parallel scanning device 500 is compatible. Upon receipt of the scan request 520, driver 504 generates parallel scan instructions 524 and 526 based on the scan request 520. Driver 504 provides the parallel scan instructions 524 and 526 to transceiver 512 and transceiver 516, respectively. In an example, embodiment, driver 504 is a Wi-Fi driver. For instance, driver 504 may be configured to provide configuration and management support such as enumerating, joining, and checking the status of available Wi-Fi networks, encryption services, etc. For example, driver 504 may emulate an Ethernet device and use the configuration and management utilities built into the operation system or utilities from other sources (e.g., vendors or manufacturers). Driver 504 is configured to access configuration registers 510 to obtain and/or store configuration parameters for transceiver 512 and transceiver 516. Host interface 508 enables driver 504 to interact with various other components of parallel scanning device 500.

Transceiver 512 and transceiver 516 are configured to receive parallel scan instructions 524 and 526 from driver 504 and to perform a parallel scanning operation accordingly. The parallel scanning operation may include an active scan and/or a passive scan by each of transceiver 512 and transceiver 516. An active scan involves the generation of probe request frames and subsequent processing of received probe response frames. For example, transceiver 512 may actively send a probe request frame on channel 1 of the 2.4 GHz frequency band and receives a probe response frame from an access point that is available on channel one. A passive scan involves the broadcast of beacons from available access points in a designated channel and subsequent processing of received beacons. For example, transceiver 516 may passively listen for a beacon from an access point on channel 36 of the 5 GHz frequency band. Scan results from both transceiver 512 and transceiver 516 are collected by driver 504 and provided to application 502 for further processing. Scan results may include information about access points (e.g., identifiers, capabilities, etc.) discovered during the parallel scan operation in the 2.4 GHz frequency band and/or the 5 GHz frequency band.

Application 502 may utilize the scan results to form decisions regarding the available access points and/or communication network. For example, application 502 may decide to begin the association process with one of the access points discovered during the scanning operation.

Figure 6:
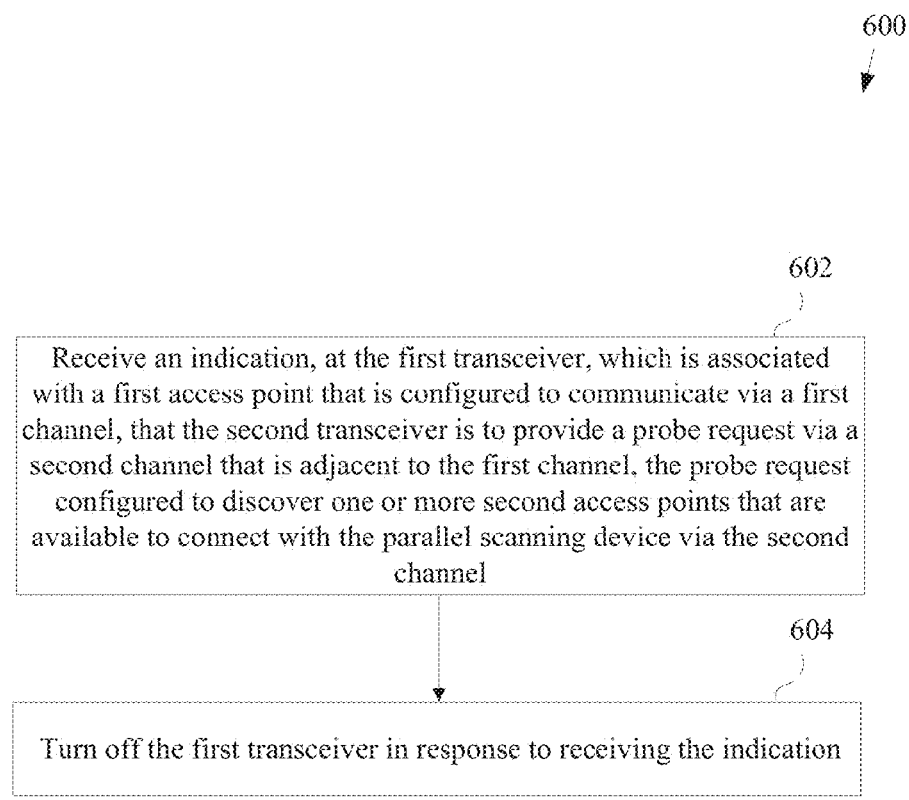
FIG. 6 depicts a flowchart of an example method for scanning a plurality of channels in a wireless network frequency band in accordance with an embodiment.

In embodiments, parallel scanning device 200 or parallel scanning device 500 may operate in various ways to perform a scanning operation using the included first and second transceivers. For instances, FIG. 6 depicts a flowchart 600 of an example method for scanning a plurality of channels in a wireless network frequency band in accordance with an embodiment. In accordance with the embodiment of FIG. 6, two transceivers, each having a dedicated antenna, are used to scan one frequency band to leverage channel switching time. Flowchart 600 is described with respect to parallel scanning device 200 and parallel scanning device 500 for illustrative purposes. The steps of flowchart 600 may be performed in an order different than shown in FIG. 6 in some embodiments. Further structural and operational embodiments will be apparent to persons skilled in the relevant art(s) based on the following description of flowchart 600 and parallel scanning device 500.

Flowchart 600 begins with step 602. In step 602, the first transceiver, which is associated with a first access point that is configured to communicate via a first channel, receives an indication that the second transceiver is to provide a probe request via a second channel that is adjacent to the first channel. The probe request is configured to discover one or more second access points that are available to connect with the parallel scanning device via the second channel.

For example, in an embodiment, transceiver 512 may be associated with an access point on channel 36 of the 5 GHz frequency band. Transceiver 512 may receive an indication from driver 504 and/or transceiver 516 that transceiver 516 is to transmit a probe request via channel 40 of the same frequency band (i.e., the 5 GHz frequency band in this example). For instance, channel 40 may be adjacent to channel 36.

In accordance with this example, while transceiver 516 prepares to scan channel 40 (e.g., preparing the probe request, issuing a channel switch request, etc.), transceiver 512 may facilitate the scanning operation by transmitting designated frames to the associated access point. For instance, transceiver 512 may send a message to the associated access point, requesting that the first access point suspend communication with the parallel scanning device 500 for a period of time. In particular, transceiver 512 may be configured to send a frame (e.g., CTS2Self) to protect data that will be sent from parallel scanning device 500. Such a frame may include information such as receiver address, time duration, and a frame check sequence. Additionally or alternatively, transceiver 512 may initiate a successful frame exchange (e.g., Announce PM=1) with the associated access point in order to change power management modes. The power management modes may include but are not limited to an active mode (AM), during which parallel scanning device 500 is awake and may receive a frame at any time, and a power save (PS) mode, during which parallel scanning device 500 listens for beacons and sends PS-poll frames to the associated access point without transmitting or receiving normal data to and from the associated access point. Once the necessary frames (e.g., channel switch request, power management request, data/ACK request) have been transmitted to the associated access point, flowchart 600 proceeds to the next step.

In step 604, the first transceiver is turned off in response to receiving the indication. For example, in the embodiment described above, transceiver 512 is turned off (e.g., powered down or switched to idle mode) in response to receiving the indication that transceiver 516 is to provide a probe request via channel 40, which is adjacent to channel 36 in the 5 GHz frequency band, and further in response to the transmittal of the necessary frames to prepare transceiver 516 to scan channel 40.

With transceiver 512 being off, there is no risk of transceiver 512 causing channel interference with respect to transceiver 516 if transceiver 516 is turned on. Accordingly, transceiver 516 may be turned on to initiate a scanning operation. During the scanning operation, transceiver 516 may provide the probe request via channel 40, and driver 504 may monitor channel 40 during a designated period of time (e.g., dwell time) to determine whether at least one response is received from at least one second access point.

After the dwell time, as transceiver 516 prepares to scan the next channel, transceiver 512 may be turned on to resume normal functionality. In particular, transceiver 512 may be turned on to receive a beacon from the first, associated access point while transceiver 516 is preparing to provide a second probe request via a third channel, which is different from the first channel and the second channel. The second probe request is configured to discover one or more third access points that are available to connect with the parallel scanning device via the third channel. For example, transceiver 512 may be turned on as transceiver 516 is preparing to provide the second probe request via channel 44 in the 5 GHz frequency band.

The disclosed technologies may be embodied in hardware, and/or a combination of hardware, software and/or firmware implementations other than those described herein. Any software, hardware, and firmware implementations suitable for performing the functions described herein can be used.

C. Examples Illustrating Scanning Times

The parallel scanning process can reduce the time required to scan all the channels in one or more frequency bands. For example, the total scan time may be computed as a product of the number of channels to be scanned and the dwell time, which is a configurable parameter. If the dwell time is designated to be 20 milliseconds (ms) and there are 11 available channels in the 2.4 GHz frequency band, it would take 220 ms to complete the scan of the 2.4 GHz frequency band. There are far more channels in the 5 GHz frequency band than in the 2.4 GHz frequency band. Thus, according to the above example, the scan of the 2.4 GHz frequency band may be completed before that the scan of the 5 GHz frequency band. Using a parallel scanning technique described herein, the total scan time of both the 2.4 GHz frequency band and the 5 GHz frequency band may be reduced by at least 220 ms.

Such parallel scanning technique can substantially reduce the scanning time as compared to sequential scanning techniques. For example, assume there are 14 channels in the 2.4 GHz frequency band and 29 channels, of which 13 are dynamic frequency selection (DFS) channels, in the 5 GHz frequency band. DFS channels are regulated as mandatory passive scan channels. Thus, for the passive scan channels, the dwell time may be set at 110 ms, and for the active scan channels, the dwell time may be set at 20 ms. The scan time for both the 2 GHz frequency band and the 5 GHz frequency band according to the sequential scanning technique may be calculated as:

2 GHz active scan time+5 GHz active scan time+5 GHz passive scan time=(14×20)+(29−13)×20+ 13×110)=2030 ms (or approximately 2 seconds)

In contrast, the scan time for both the 2 GHz frequency band and the 5 GHz frequency band according to the parallel scanning technique may be calculated as:

MAX(2 GHz active scan time,5 GHz active scan time)+0.5×(5 GHz passive scan time)=MAX (280,320)+1430/2=1035 ms (or approximately 1 second).

D. Example Computing System Implementation

Figure 7:
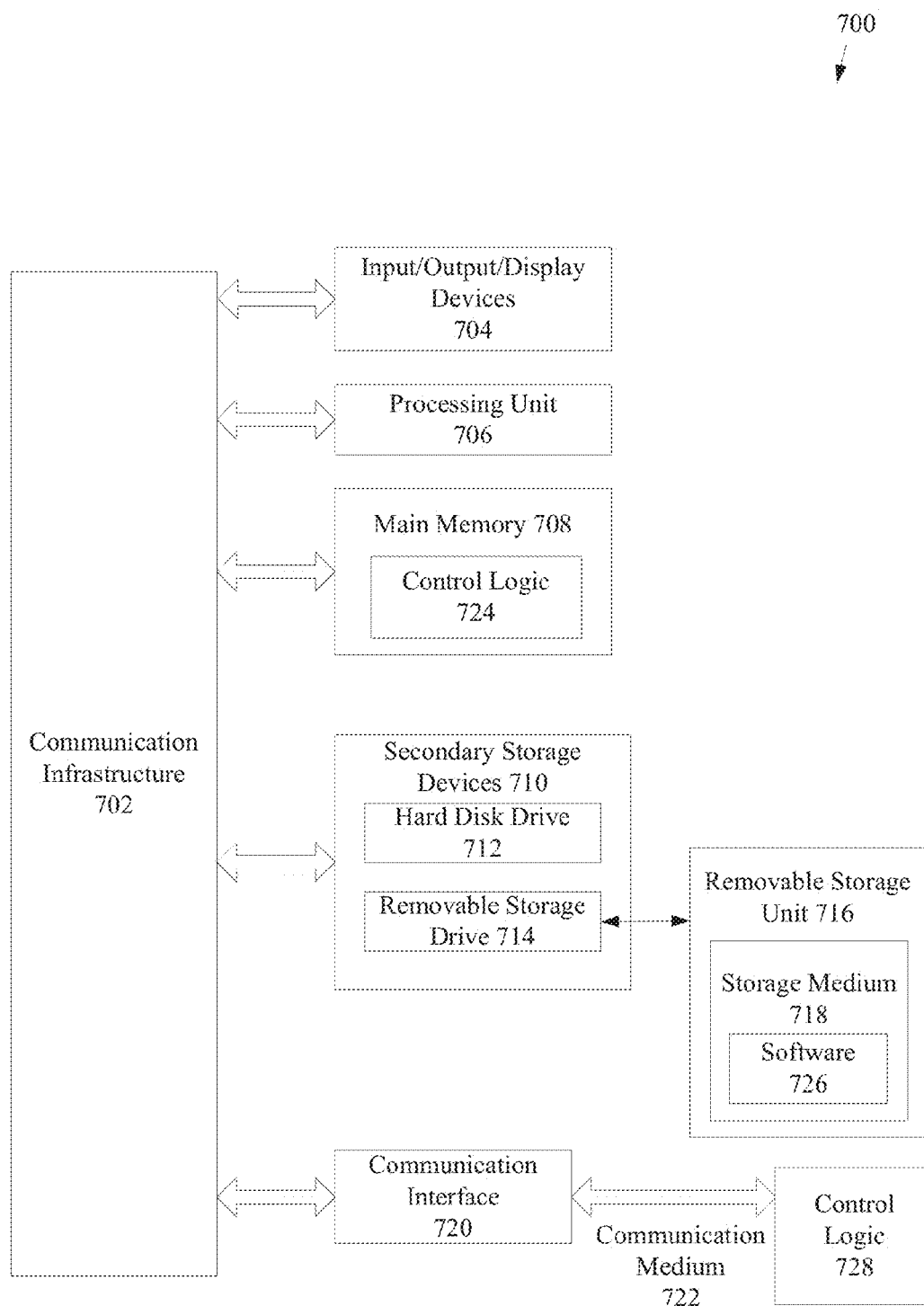
FIG. 7 is a block diagram of an example computing system that may be used to implement various embodiments.

The embodiments described herein, including systems, methods/processes, and/or apparatus, may be implemented using well known computing devices, such as computer 700 shown in FIG. 7. For example, parallel scanning device 104 depicted in FIG. 1; elements of parallel scanning device 200 including scanning logic 204 depicted in FIG. 2; elements of parallel scanning device 500 including driver 504 depicted in FIG. 5; each of the steps of flowchart 300 depicted in FIG. 3; and each of the steps of flowchart 600 depicted in FIG. 6 can each be implemented using one or more computers 700.

As shown in FIG. 7, computer 700 includes a processing unit 706. Processing unit 706 may comprise one or more processors (also called central processing units or CPUs) or processor cores. Processing unit 706 is connected to a communication infrastructure 702, such as a communication bus. Computer 700 also includes a primary or main memory 708, such as random access memory (RAM). Main memory 708 has stored therein control logic 724 (computer software), and data.

Computer 700 also includes one or more secondary storage devices 710. Secondary storage devices 710 include, for example, a hard disk drive 712 and/or a removable storage device or drive 714, as well as other types of storage devices, such as memory cards and memory sticks. For instance, computer 700 may include an industry standard interface, such as a universal serial bus (USB) interface for interfacing with devices such as a memory stick. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 718 having stored therein computer software 726 (control logic) and/or data. Removable storage unit 1216 represents a floppy disk, magnetic tape, compact disc (CD), digital versatile disc (DVD), Blu-ray disc, optical storage disk, memory stick, memory card, or any other computer data storage device. Removable storage drive 714 reads from and/or writes to removable storage unit 716 in a well-known manner.

Computer 700 also includes input/output/display devices 704, such as monitors, keyboards, pointing devices, etc.

Computer 700 further includes a communication or network interface 720. Communication interface 720 enables computer 700 to communicate with remote devices. For example, communication interface 720 allows computer 700 to communicate over communication networks or mediums 722 (representing a form of a computer useable or readable medium), such as local area networks (LANs), wide area networks (WANs), the Internet, etc. Network interface 720 may interface with remote sites or networks via wired or wireless connections. Examples of communication interface 722 include but are not limited to a modem (e.g., for 3G and/or 4 G communication(s)), a network interface card (e.g., an Ethernet card for Wi-Fi and/or other protocols), a communication port, a Personal Computer Memory Card International Association (PCMCIA) card, a wired or wireless USB port, etc.

Control logic 728 may be transmitted to and from computer 700 via the communication medium 722.

Any apparatus or manufacture comprising a computer useable or readable medium having control logic (software) stored therein is referred to herein as a computer program product or program storage device. This includes, but is not limited to, computer 700, main memory 708, secondary storage devices 710, and removable storage unit 716. Such computer program products, having control logic stored therein, may be executed by processing unit 706 to perform methods described herein. For example, such computer program products, when executed by processing unit 706, may cause processing unit 706 to perform any of the steps of flowchart 300 of FIG. 3 and flowchart 600 of FIG. 6. The disclosed technologies may be embodied in software, hardware, and/or firmware implementations other than those described herein. Any software, hardware, and firmware implementations suitable for performing the functions described herein can be used.

E. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method comprising:
   receiving a scan instruction indicating that a plurality of channels of a wireless network are to be scanned; and
   initiating a scanning operation with regard to the plurality of channels in response to receiving the scan instruction, the scanning operation comprising:
   simultaneously providing a first probe request via a first channel of the plurality of channels from a first transceiver of a parallel scanning device and a second probe request via a second channel of the plurality of channels from a second transceiver of the parallel scanning device in response to receiving the scan instruction, the first probe request configured to discover one or more first access points that are available to connect with the parallel scanning device via the first channel, the second probe request configured to discover one or more second access points that are available to connect with the parallel scanning device via the second channel.

2. The method of claim 1, wherein simultaneously providing the first probe request and the second probe request comprises:
   simultaneously providing the first probe request via the first channel in a first wireless local area network frequency band and the second probe request via the second channel in a second wireless local area network frequency band that is different from the first wireless local area network frequency band.

3. The method of claim 1, wherein simultaneously providing the first probe request and the second probe request comprises:
   simultaneously providing the first probe request via the first channel and the second probe request via the second channel in a same wireless local area network frequency band.

4. The method of claim 1, wherein simultaneously providing the first probe request and the second probe request comprises:
   simultaneously providing the first probe request via the first channel and the second probe request via the second channel in a 5 gigahertz wireless local area network frequency band.

5. The method of claim 1, wherein simultaneously providing the first probe request and the second probe request comprises:
   simultaneously providing the first probe request and the second probe request from a single antenna.

6. The method of claim 1, wherein simultaneously providing the first probe request and the second probe request comprises:
   simultaneously providing the first probe request from a first antenna and the second probe request from a second antenna that is different from the first antenna.

7. The method of claim 1, wherein the scanning operation further comprises:
   monitoring the first channel during a designated period of time to determine whether at least one first response is received from at least one respective first access point via the first channel in response to the first probe request; and
   monitoring the second channel during the designated period of time to determine whether at least one second response is received from at least one respective second access point via the second channel in response to the second probe request.

8. The method of claim 1, further comprising:
   providing scan results regarding the scanning operation to an application, the scan results indicating each first access point from which a first response is received and each second access point from which a second response is received.

9. A parallel scanning device comprising:
   scanning logic configured to provide a scan instruction indicating that a plurality of channels of a wireless network are to be scanned; and
   first and second transceivers configured to simultaneously provide respective first and second probe requests via respective first and second channels of the plurality of channels in response to receipt of the scan instruction, the first probe request configured to discover one or more first access points that are available to connect with the parallel scanning device via the first channel, the second probe request configured to discover one or more second access points that are available to connect with the parallel scanning device via the second channel.

10. The parallel scanning device of claim 9, wherein the first channel is in a first wireless local area network frequency band and the second channel is in a second wireless local area network frequency band that is different from the first wireless local area network frequency band.

11. The parallel scanning device of claim 9, wherein the first channel and the second channel are in a same wireless local area network frequency band.

12. The parallel scanning device of claim 9, wherein the first channel and the second channel are in a 5 gigahertz wireless local area network frequency band.

13. The parallel scanning device of claim 9, wherein the first and second transceivers are configured to simultaneously provide the respective first and second probe requests from a single antenna.

14. The parallel scanning device of claim 9, wherein the first and second transceivers are configured to simultaneously provide the respective first and second probe requests from respective first and second antennas.

15. The parallel scanning device of claim 9, wherein the scanning logic is further configured to monitor the first channel during a designated period of time to determine whether at least one first response is received from at least one respective first access point via the first channel in response to the first probe request, and wherein the scanning logic is further configured to monitor the second channel during the designated period of time to determine whether at least one second response is received from at least one respective second access point via the second channel in response to the second probe request.

16. The parallel scanning device of claim 9, wherein the scanning logic is further configured to provide scan results to an application, the scan results indicating each first access point that is available to connect with the parallel scanning device via the first channel and each second access point that is available to connect with the parallel scanning device via the second channel.

17. The parallel scanning device of claim 9, wherein the scanning logic is further configured to determine an isolation measure between the first and second channels, the isolation measure indicating an extent of isolation that exists between the first and second channels.

18. A computer program product comprising a computer-readable storage device having computer control logic stored therein that, when executed by one or more processors, causes the one or more processors to perform a method comprising:
receiving a scan instruction indicating that a plurality of channels of a wireless network are to be scanned; and
initiating a scanning operation with regard to the plurality of channels in response to receiving the scan instruction, the scanning operation comprising:
simultaneously providing a first probe request via a first channel of the plurality of channels from a first transceiver of a parallel scanning device and a second probe request via a second channel of the plurality of channels from a second transceiver of the parallel scanning device in response to receiving the scan instruction, the first probe request configured to discover one or more first access points that are available to connect with the parallel scanning device via the first channel, the second probe request configured to discover one or more second access points that are available to connect with the parallel scanning device via the second channel.

19. The computer program product of claim 18, wherein simultaneously providing the first probe request and the second probe request comprises:
simultaneously providing the first probe request via the first channel in a first wireless local area network frequency band and the second probe request via the second channel in a second wireless local area network frequency band that is different from the first wireless local area network frequency band.

20. The computer program product of claim 18, wherein simultaneously providing the first probe request and the second probe request comprises:
simultaneously providing the first probe request via the first channel and the second probe request via the second channel in a same wireless local area network frequency band.

* * * * *